US008645603B2

(12) United States Patent
Melvin, Jr. et al.

(10) Patent No.: US 8,645,603 B2
(45) Date of Patent: Feb. 4, 2014

(54) DEVICE HAVING BOARD SLOT CONCATENATION FOR ACCOMMODATING MULTIPLE SIZES OF COMMUNICATION DEVICE ELEMENTS

(75) Inventors: Charles W. Melvin, Jr., Dudley, GA (US); Phillip Warren, Macon, GA (US); Michael Dempsey, Madison, MS (US)

(73) Assignee: Itron, Inc, Liberty Lake, WA (US)

( * ) Notice: Subject to any disclaimer, the term of this patent is extended or adjusted under 35 U.S.C. 154(b) by 298 days.

(21) Appl. No.: 12/899,468

(22) Filed: Oct. 6, 2010

(65) Prior Publication Data

US 2012/0054398 A1     Mar. 1, 2012

Related U.S. Application Data

(60) Provisional application No. 61/377,044, filed on Aug. 25, 2010.

(51) Int. Cl.
*H05K 7/10* (2006.01)
*G06F 13/38* (2006.01)

(52) U.S. Cl.
CPC .................................. *G06F 13/385* (2013.01)
USPC ................. 710/301; 710/62; 710/60; 710/61; 710/305

(58) Field of Classification Search
USPC ........... 710/300–315, 104–110, 72–74, 8–19, 710/58–64; 713/300–340
See application file for complete search history.

(56) References Cited

U.S. PATENT DOCUMENTS

| | | | |
|---|---|---|---|
| 6,073,229 A * | 6/2000 | Crane et al. | 712/33 |
| 6,184,592 B1 | 2/2001 | Rauhala et al. | |
| 6,216,184 B1 * | 4/2001 | Fackenthall et al. | 710/301 |
| 6,572,384 B1 | 6/2003 | Marchevsky | |
| 6,699,053 B2 | 3/2004 | Kuroda | |
| 6,863,571 B2 | 3/2005 | Sato et al. | |
| 6,913,492 B2 | 7/2005 | Kuroda et al. | |
| 7,140,900 B1 | 11/2006 | Villanueva | |
| 7,147,515 B1 | 12/2006 | Hung et al. | |
| 7,275,944 B1 | 10/2007 | Lai | |
| 7,292,946 B2 | 11/2007 | Huang et al. | |
| 7,309,259 B2 | 12/2007 | Sun et al. | |
| 7,539,801 B2 | 5/2009 | Xie et al. | |

(Continued)

FOREIGN PATENT DOCUMENTS

CN      201152973 Y      11/2008

*Primary Examiner* — Raymond Phan
(74) *Attorney, Agent, or Firm* — Hanley, Flight and Zimmerman, LLC

(57) ABSTRACT

In one embodiment, a main circuit board includes a plurality of expansion slots that are operative to receive a corresponding plurality of expansion cards. The plurality of expansion slots include at least one first expansion slot configured at a first position on the main circuit board, that is operative to connect to at least one corresponding first expansion card. At least one second expansion slot configured at a second position on the main circuit board, and the second expansion slot is operative to connect to at least one corresponding second expansion card. The plurality of expansion cards includes at least one secondary expansion card that is different from the main circuit board and that is configured to be operatively coupled to at least one of the plurality of expansion slots. One or more particular expansion slots are selected for connecting one or more corresponding particular expansion cards, based on the size, dimensions, and/or function of the particular expansion cards to be connected. A programmable processor is operative to selectively regulate power supplied to particular expansion slots.

24 Claims, 10 Drawing Sheets

(56) References Cited

U.S. PATENT DOCUMENTS

| | | |
|---|---|---|
| 7,546,472 B2 * | 6/2009 | Kamepalli et al. ............ 713/300 |
| 7,627,709 B2 * | 12/2009 | Bacom et al. ................. 710/315 |
| 7,698,488 B2 | 4/2010 | Lu |
| 8,165,471 B2 * | 4/2012 | Theodoras et al. ........... 398/135 |
| 2002/0065970 A1 * | 5/2002 | Tanaka et al. ................. 710/301 |
| 2003/0154415 A1 * | 8/2003 | Farkas et al. ................. 713/300 |
| 2005/0215085 A1 | 9/2005 | Mehta et al. |
| 2006/0109636 A1 | 5/2006 | Hood et al. |
| 2006/0158864 A1 | 7/2006 | Gay |
| 2006/0181857 A1 * | 8/2006 | Belady et al. ................. 361/719 |
| 2006/0277343 A1 * | 12/2006 | Lin et al. ....................... 710/301 |
| 2006/0282593 A1 * | 12/2006 | Crane et al. ................... 710/300 |
| 2009/0004921 A1 | 1/2009 | Hubert et al. |
| 2009/0138741 A1 * | 5/2009 | Kamepalli et al. ............ 713/340 |

\* cited by examiner

DEVICE HAVING BOARD SLOT CONCATENATION FOR ACCOMMODATING MULTIPLE SIZES OF COMMUNICATION DEVICE ELEMENTS

CROSS REFERENCE TO RELATED PATENT APPLICATION

This application claims the benefit, pursuant to 35 U.S.C. §119(e) of U.S. provisional Application Ser. No. 61/377,044 filed Aug. 25, 2010, entitled "Device Having Board Slot Concatenation for Accommodating Multiple Sizes of Communication Device Elements" by Charles W. Melvin, Phillip Warren, and Michael Dempsey, the disclosure for which is hereby incorporated by reference in its entirety.

FIELD OF THE INVENTION

The present application relates generally to network routers, and more specifically to an intelligent communications device for a smart grid, hereinafter also referred to as an "apparatus" or "network apparatus", for managing interconnection of various electrical devices and facilities.

In one aspect, the present invention relates to a system and method for accommodating multiple sizes of communication device elements.

BACKGROUND OF THE INVENTION

Typically a motherboard, alternatively known as a main circuit board, contains internal bus connectors, such as Peripheral Component Interconnect (PCI), PCI-X connectors, and PCI-Express (PCIe) connectors. PCI connectors facilitate the connection of different peripheral components, such as expansion cards, through an expansion slot. The expansion slot of the PCI connector allows insertion of an expansion card, thereby connecting the expansion card to the main circuit board.

In recent years, it has been observed that a number of electronic devices require expansion cards of different shapes and sizes. These expansion cards can be large, small, thick, or thin in its shape and size, depending on the function of the electronic device. For example, a legacy electronic device such as a radio requires mounting of a large expansion card as compared to a conventional electronic device that requires mounting of a standard size expansion card. The large expansion cards not only require more space on the PCI slots, but also consume more power as compared to the standard size expansion cards used with the conventional electronic devices. The conventional layout of the expansion slots on a circuit board in general does not provide for mounting of non-standard size expansion cards. Moreover, the mounting of non-standard size expansion cards can under-utilize remaining expansion slots spread on the main circuit board. In such a scenario, where more space is required for installing an expansion card, the PCI slots provide for installation of a limited number of expansion cards. Thus, in the case where various kinds of expansion cards are desired to be used on the main circuit board with expansion slots, the conventional structure of the main circuit board does not allow for the usage of non-standard size expansion cards.

Hence, there exists a need for deployment of expansion slots on the main circuit board configured in such a manner that non-standard size expansion cards can be installed on the main circuit board.

SUMMARY OF THE INVENTION

In one aspect, the present invention relates to a system and method for controlling operation of a plurality of electronic devices in a smart grid. In one or more exemplary embodiments, an intelligent communications device is operatively connected with other devices and/or systems and one or more electrical distribution networks. One or more of these electronic devices may work in collaboration with the intelligent communications device in a smart grid network infrastructure. In one or more embodiments, the electronic devices may be arranged in various configurations to operate in networks such as LAN, WAN, and/or HAN networks.

In one embodiment, the intelligent communications device is configured with other devices and/or monitoring equipment for monitoring and management of electrical energy consumption. The intelligent communications device operates on wireless communications networks and according to one or more wireless protocols such as commercial cellular, Bluetooth, and/or 802.11.

In one embodiment, the intelligent communication device is field upgradable, and is configured such that additional hardware can be installed for enabling new protocols or technologies to be developed. The intelligent communications device is operative to implement open source software configured to facilitate integration of different types of devices with additional circuitry and/or hardware. Further, the intelligent communications device is operable to update the open source software periodically or at a pre-defined time.

In another aspect, the present invention relates to a main circuit board that includes a plurality of expansion slots that are operative to receive a corresponding plurality of expansion cards. In one embodiment, the plurality of expansion slots include at least one first expansion slot configured at a first position on the main circuit board and operative to connect to at least one corresponding first expansion card. The plurality of expansion slots also include at least one second expansion slot configured at a second position on the main circuit board, that is operative to connect to at least one corresponding second expansion card. The plurality of expansion cards includes at least one secondary expansion card that is different from the main circuit board and that is configured to be operatively coupled to at least one of the plurality of expansion slots. One or more particular expansion slots of the plurality of expansion slots are selected for connecting one or more corresponding particular expansion cards, based on the size and dimensions of the particular expansion cards to be connected. The main circuit board has a programmable processor that is operative to selectively regulate power supplied to particular expansion slots of the plurality of expansion slots.

In yet another aspect, the present invention relates to a method of configuring a plurality of expansion slots on a main circuit board for operating one or more secondary expansion cards. In one embodiment, the method includes operatively coupling a programmable processor to the plurality of expansion slots on the main circuit board, and configuring, using the programmable processor, the plurality of expansion slots operative on the main circuit board. At one pair of the plurality of expansion slots are spaced at a distance on the main circuit board such that a secondary expansion card having different size and dimensions from at least one other secondary expansion card is capable of being operatively coupled. The method further includes regulating, using the programmable processor, power supplied to particular expansion slots of the plurality of expansion slots, based on at least one of the size, dimensions, and function of the secondary expansion cards operatively coupled.

In yet another aspect, the present invention relates to a main circuit board that includes a plurality of expansion slots configured to operatively connect to a corresponding plurality of expansion cards. In one embodiment, the plurality of expansion slots includes a plurality of first expansion slots disposed at a first position on the main circuit board, and operative to connect to a corresponding plurality of first expansion cards. A plurality of second expansion slots disposed at a second position on the main circuit board and operative to connect to a corresponding plurality of second expansion cards. At least one pair of the plurality of expansion slots is spaced at a distance on the main circuit board such that an expansion card having a different size and function from at least one other expansion card is operatively connected to the plurality of expansion slots. At least one of the plurality of expansion cards includes an adjacent pair of edge connectors configured to be operatively coupled to two adjacent expansion slots of the first or the second expansion slots, such that the adjacent pair of edge connectors is aligned with the two adjacent expansion slots. The main circuit board further includes a programmable processor operative to selectively regulate power supplied to particular expansion slots of the plurality of expansion slots. The programmable processor can also be programmed to selectively regulate the temperature at one or more of the plurality of expansion slots.

DETAILED DESCRIPTION OF THE INVENTION

Description of the various embodiments detailed below is for understanding the invention. It will be understood that the invention is not limited to the particular embodiments described herein, but is capable of various modifications, rearrangements and substitutions, which will now become apparent to those skilled in the art without departing from the scope of the invention. Therefore, it is intended that the following claims cover all such modifications and changes that fall within the spirit and scope of the invention.

In alternative embodiments, system, process, and apparatus may include additional, fewer, or different components. In addition, the each component may include additional modules, software, and interface devices that may be appended on requirement to operate the present invention in alternate embodiments.

Figure 1:
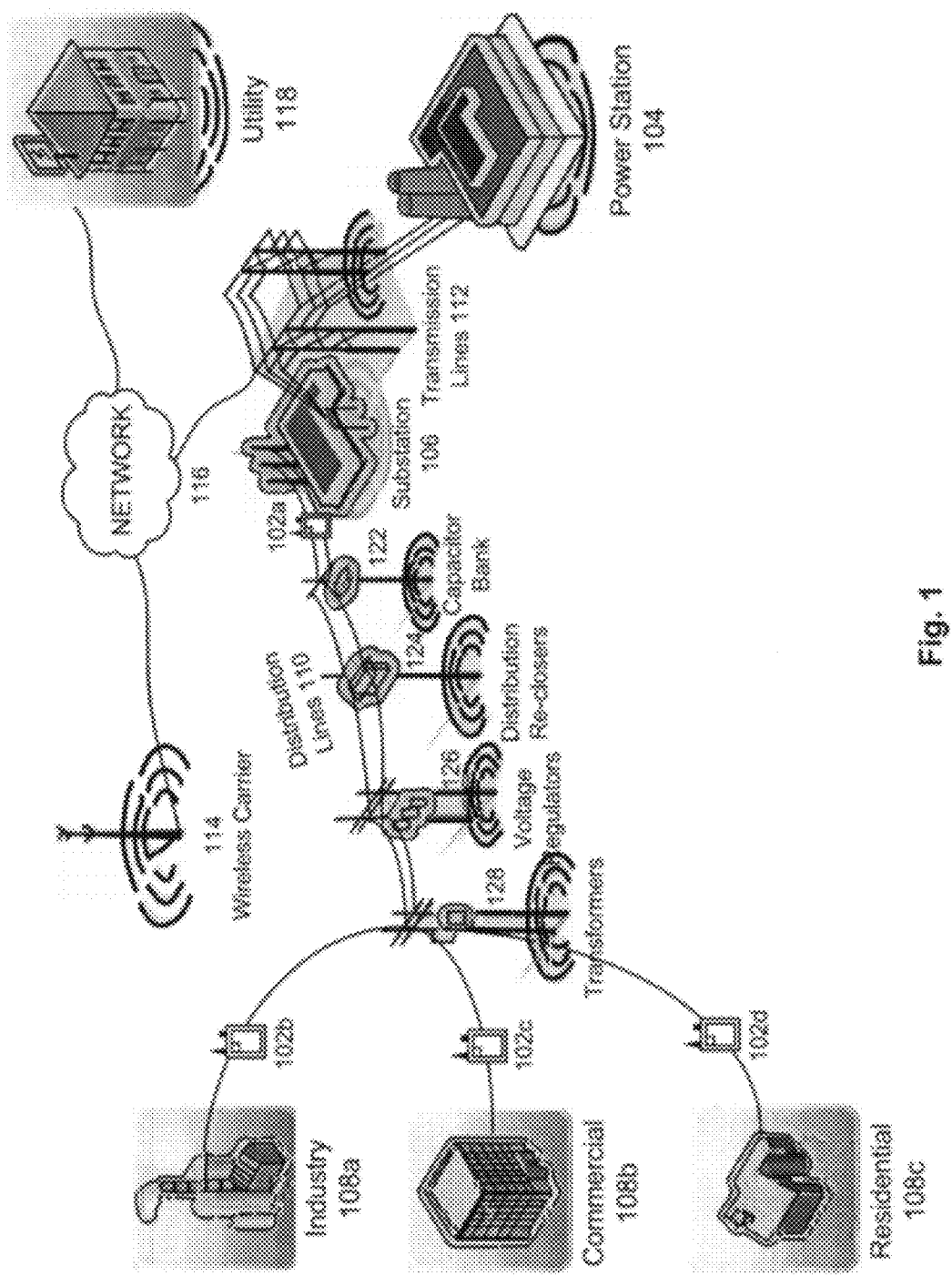
FIG. 1 is a schematic illustration of an overall environment in which one or more aspects of the present invention can be practiced.

Referring to FIG. 1, an intelligent communications device for a smart grid communicatively coupled to a plurality of devices and/or facilities for management of energy requirements is depicted. Integration of the intelligent communications device 102 into the smart grid infrastructure may be performed using minimal capital expenditure.

FIG. 1 illustrates an environment in which the present invention may be practiced. The environment may include a plurality of electrical generation facilities such as thermal power plants, hydro-based power plants (dams, for example), solar powered electricity generation units, and wind powered electricity generation units. Various electricity-generating plants are collectively referred to as power generation units 104. The electricity generated from the power generation units 104 may be distributed through a plurality of high voltage transmission lines 112 to a substation 106. For example, high voltage electricity may be distributed via plurality of towers and a plurality of medium voltage distribution cables 110.

By way of example and not a limitation in one implementation, the substation 106 may receive power from the plurality of high voltage transmission lines 112 from at least one of the plurality of substations such as power station 104. Further, the substation 106 may be associated with an intelligent communications device 102. The intelligent communications device 102 may monitor various parameters such as quality of electricity and electrical load.

The substation 106 may then distribute low voltage electricity to residential entities 108c, industrial entities 108a, and/or commercial entities 108b. The medium voltage distribution lines 110 may include attachments of various devices for improvement of quality electricity. As such, the plurality of distribution lines 110 may run moderate distances and are affected by cable resistance, electrical grid loading, and other factors which constantly effect the operation and efficiency of the electric grid. In order to compensate for a variety of operating conditions, the plurality of distribution lines 110 may include connections to capacitor banks 122, distribution re-closers 124, voltage regulators 126, transformers 128 and other types of equipment.

The electricity may be supplied to the one or more industrial entities such as industry 108a, via intelligent communications device 102b. Likewise, the plurality of distribution lines 110 may feed electricity to one or more commercial entities such as commercial entity 108b, one or more residential entities 108c, through intelligent communications devices 102c and 102d. Hereinafter, intelligent communications devices 102a, 102b, 102c, and 102d may be collectively referred to as "intelligent communications device 102."

The intelligent communications device 102 may be configured to operate with a central control station, regulatory authority, audit compliance authority, and/or electrical monitoring systems. Apart from monitoring the various parameters such as electrical quality, the intelligent communications device 102 may be coupled wirelessly to a plurality of wireless carriers such as 114. Alternatively, the intelligent communications device 102 may be coupled with communications network 116 using powerline communication. Further, the wireless carrier 114 may receive signals that may be utilized for moderating the distribution of electricity from the substation 106 to industrial entity 108a, commercial entity 108b, and/or residential entity 108c.

The intelligent communications device 102 may be connected with a plurality of utilities in a building, a commercial complex, and/or an industry. By way of example and not a limitation, in one implementation, intelligent communications device 102 may be connected to utility 118. In an embodiment, the utility 118 may include lighting systems, refrigerators, air conditioners, computers, televisions, home theaters, electric irons, water filters, air filters, air compressors, and/or vacuum cleaners. The intelligent communications device 102 may directly control the utility 118. In another embodiment, one or more intelligent communications devices 102 may indirectly control the utility 118. In yet another embodiment, the utility 118 may be partially controlled by one or more intelligent communications devices 102 for modulating the electrical consumption. It may be noted that only one implementation is provided; however, those skilled in the art would appreciate that various other implementations are possible without deviating from the scope and spirit of the invention.

The utility may be grouped into essential and non-essential electrical equipment for purposes of control. In this embodiment, the intelligent communications device 102 may be programmed to monitor the one or more utilities 118 on a rule based program.

In an embodiment of the present invention, the intelligent communications device 102 may be coupled to multiple consumers such as industrial entities 108a, commercial entities 108b, and residential entities 108c. The consumer 108a, 108b, and 108c may be hereinafter collectively referred to as 'consumers 108'. The intelligent communications device 102 may facilitate management of electricity to one or more consumers 108. Additionally, the intelligent communications device 102 may also be integrated to communications backhaul providers that may work in synchronization for accumulating data related to electrical consumption, load distribution, quality of electricity, power factor, and/or failure of equipment associated with the distribution of electricity. The information may be communicated to control and monitoring station, either through the network 116 or through wireless carriers 114.

In an embodiment of the present invention, the consumers 108 may be distributed in a geographically area and may be connected to each other through a smart grid. In addition, each consumer 108a may have one or more smart appliances. The smart appliances may be managed by the intelligent communications device 102 for optimizing electricity consumption.

Figure 2:
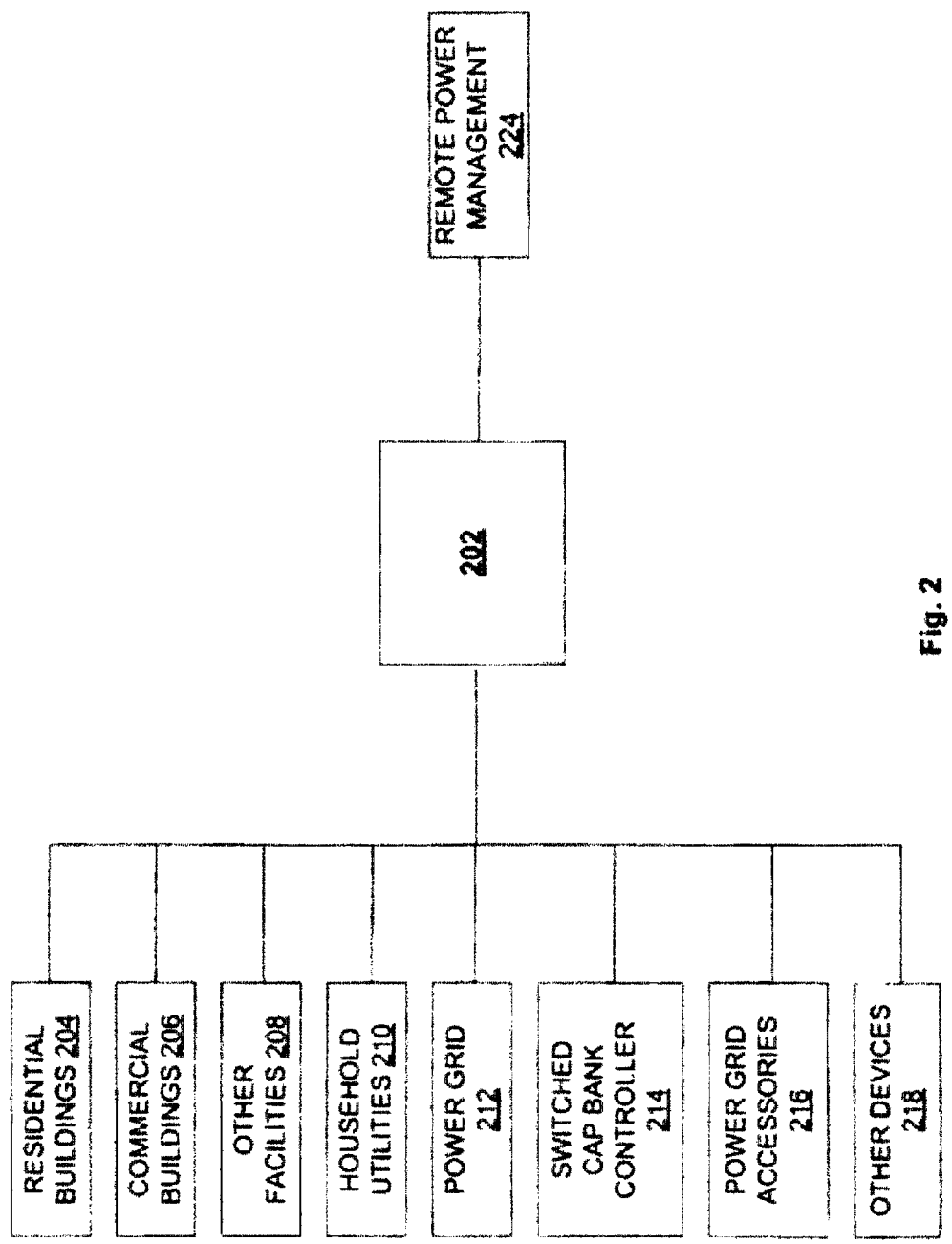
FIG. 2 depicts various facilities, devices and equipment interfaced with an intelligent communications device according to one embodiment of the present invention.

Referring to FIG. 2, an arrangement of configuring various electrical facilities with an intelligent communications device 202 is shown, according to one embodiment of the present invention. The intelligent communications device 202 may communicate with the plurality of devices and/or facilities, such as but not limited to, residential buildings 204, commercial entities 206, other facilities 208, household utilities 210, power grids 212, switched cap bank controllers 214, grid accessories 216, other devices 218, and remote power management utilities 224. Other facilities 208 may include but not limited to schools, small offices, sports complexes, shops, malls, federal offices, utility complexes, or other types of buildings having electrical connection and consuming electricity. The intelligent communications device 202 may facilitate energy management for one or more of the devices and/or facilities as shown.

Power Management

In an embodiment of the present invention, the intelligent communications device 102 may enable distribution companies to reduce the overall power requirement through better management. This in turn may help in reducing the need for power generation thereby reducing environmental damage. Further, the intelligent communications device 102 may act as a communications hub for monitoring electrical usage, power consumption, quality of electricity, and/or analysis of electrical load, where examples of load type may include inductive load and/or capacitive load. The communications hub may interface various devices in order to monitor electricity consumption and/or power usage.

The intelligent communications device 102 may enable integration of various utilities with the grid for optimizing the overall performance of the system. For example, the load requirement of a particular building may be assessed/monitored using the intelligent communications device 102. The data collected by the intelligent communications device 102 from the various utilities may be utilized for improving the overall electrical consumption of these utilities thereby saving cost and electricity. Alternatively, the intelligent communications device 102 may monitor the performance of different electrical utilities and may facilitate their management in an optimized way.

In another embodiment, the intelligent communications device 102 may be utilized by distribution companies for monitoring the quality of electricity and load characteristics for a specific area. The data recorded by the intelligent communications device 102 may be utilized for increasing the operational efficiency of the power grid.

In another embodiment, the intelligent communications device 102 may facilitate management of demand response for a grid. Currently, power generation and/or power distribution companies face pressure to reduce load either electronically or manually. In such settings, transmission grid operators use demand response to request load reduction in order to manage demand. One or more aspects of the present invention according to this exemplary embodiment allow for transmission grid operators to utilize the intelligent communications device 102 for electronically managing the demand response of electricity.

Integration with Power Grid

In one embodiment, the intelligent communications device 102 may include a communication module for connecting it with a smart grid. In this aspect, the intelligent communications device 102 may increase the performance of the smart grid making it more adaptable and cost effective. In addition, the intelligent communications device 102 may enable utilities to interface with the grid irrespective of the underlying technology, network, or assets. The intelligent communications device 102 may be flexible to accommodate any configuration changes and/or bandwidth changes without affecting the underlying architecture/technology.

In another embodiment of the present invention, the intelligent communications device 102 may communicate with other apparatuses. The communication may be either wireless or through wired connection. Such communication may occur in response to a critical event such as power surge, excess demand, low power factor, when immediate action is required for safeguarding the electrical equipments associated with transmission infrastructure. In another embodiment, the communication between different apparatuses may occur on a continuous basis for optimizing the performance of the system.

Field Upgradability

In another aspect of the present invention, the intelligent communications device 102 may be field-upgradable and may provide field replaceable units for preventing obsolescence. The intelligent communications device 102 may allow utilities to add multiple communication technologies to the smart grid communication infrastructure with change of the underlying technology. By integrating multiple communication technologies, the intelligent communications device 102 may act as a universal hub, to reduce the cost of purchasing additional equipment for implementing multiple network communications protocols. Consumers 108 may integrate multiple appliances and multiple communication technologies using intelligent communications device 102 thereby reducing the total cost of ownership of the equipment. Additionally, consumers 108 may upgrade the intelligent communications device 102 to integrate new communication protocols by just installing additional circuitry without changing existing equipment.

The intelligent communications device 102 may further include a software update module that may connect to the Internet for availability of firmware updates. In response to availability of firmware updates, the software update module may back-up the current firmware before upgrading the intelligent communications device 102 with the new firmware. Failure to implement the new firmware may result in reinstallation of the old firmware from the back up.

In another embodiment of the present invention, the intelligent communications device 102 may include additional slots for inserting PCB boards. These PCB boards may include circuitry for enabling specific protocol, for example, the PCB on PCB board may implement EDGE protocol. Similarly, in another example, a PCB board may implement WiMax protocol. Field service personnel may insert additional PCB boards for upgrading the existing communication protocol without having to replace the intelligent communications device 102. Thus, the intelligent communications device 102 may be upgraded while in operation.

In another embodiment of the present invention, the intelligent communications device for a smart grid may include PCB boards supporting various communication technologies such as but not limited to, WiMax, EDGE, IPv4/IPv6, Bluetooth, Infrared, broadband over powerline, and Ethernet. Software configured in the intelligent communications device 102 may be utilized to enable/disable one or more communication boards. Thus, in one implementation, the apparatus may support Ethernet. In another implementation, the intelligent communications device 102 may support Ethernet and Bluetooth. In these scenarios, the field service personnel may update the intelligent communications device 102 by enabling the boards supporting various communication technologies remotely.

In yet another embodiment of the present invention, the intelligent communications device 102 may include utilities, circuitry for upgrading it on site. Further, the intelligent communications device 102 may include software and/or modules for adding multiple communication technologies to the smart grid communications infrastructure based on future needs without having to replace an entire system backbone. By virtue of having capabilities for adding new devices and facilities, the intelligent communications device 102 may allow consumers to purchase and integrate non-interoperable proprietary technologies from multiple vendors. Vendors may integrate heterogeneous devices using intelligent communications device 102 thereby creating an open environment. In this aspect, the intelligent communications device 102 may allow for consumers to avoid being committed to a specific vendor.

Consumption Monitoring

Consumers of electricity may save money by planning their energy requirements in area implementing Time-Of-Use (TOU) pricing. Consumers may plan the use of electrical appliances in off-peak hours, when the cost of electricity is less, for reducing the total cost of electricity consumption. The intelligent communications device 102 may facilitate the reduction in total consumption of electricity by automatically switching on the electrical appliances in non-peak hours.

Network Protocol Implementation

The intelligent communications device 102 may be based on Internet Protocol (IP) thereby providing seamless integration with different type of networks. For example, the intelligent communications device 102 may facilitate communication with both public and private networks. In embodiments, the network may be either a wired network or a wireless network. Further, networks classified on the basis of scale, such as LAN, WAN, HAN, or functional relationships, such as client server, peer-to-peer, and/or active networks, overlay networks are included within the scope the invention. In an exemplary embodiment, the intelligent communications device 102 communicates using TCP/IP. Likewise, the intelligent communications device 102 may interface with other devices implementing conventional protocols.

The intelligent communications device 102 may facilitate smart grid-enabled appliances to communicate wirelessly with electrical distribution companies to manage their overall consumption of electricity. For example, the intelligent communications device 102 may manage consumption of electricity during peak hours for a distribution network. In this aspect, the intelligent communications device 102 may communicate in real-time with various facilities and other devices to optimize energy efficiency.

In an embodiment of the present invention, the intelligent communications device 102 may include an Ethernet interface for connecting it with external network such as LAN, WAN, or HAN. Further, the Ethernet interface may enable communication with Internet thereby facilitating remote management of utilities. The intelligent communications device 102 may record various parameters such as electricity consumption, power usage and may transfer the recorded data to the remote infrastructure management facility for optimization of the electrical consumption. To this end, the intelligent communications device 102 may enable optimum utilization of the grid infrastructure. The intelligent communications device 102 may be built for outdoor use and may be protected from environmental hazards.

The intelligent communications device 102 may be capable of interfacing with various protocols, networking standards, and other specifications. In an example, the intelligent communications device 102 may facilitate communication by implementing WiMax protocol. In another example, the intelligent communications device 102 may communicate using Bluetooth protocol. In embodiments, the intelligent communications device 102 may communicate using other protocols such as but not limited to token ring, EDGE, UDP, datagram and other proprietary Internet communications protocols. In an example, the intelligent communications device 102 may facilitate communication with ZigBee protocol that allows devices in the home to communicate with a smart meter and neighborhood hub.

In an embodiment of the present invention, the electrical distribution companies may analyze the electrical consumption data collected over a specified period for better management of energy. The intelligent communications device 102 may include a communication link with a database for storing electrical consumption data. In an embodiment, the specified period may be an hour, a day, a month, a year, or any combination of these.

The intelligent communications device 102 may facilitate interoperability among smart grid devices, thereby facilitating seamless deployment of smart devices in a smart grid. In this aspect, various smart devices including smart appliances and smart meters may work in harmony with the intelligent communications device 102. Thus, the intelligent communications device 102 may integrate into the existing smart grid deployment without competing with other existing devices.

Alternatively, it may enhance the capability of other smart devices. In an embodiment of the invention, the intelligent communications device 102 may allow integration with other devices without the need for installing additional devices and/or interface circuitry. The smart devices can be configured with the intelligent communications device 102 for management of smart appliances for increasing the operational efficiency of the smart grid. Smart appliances refer to the class of products that enable communication with smart meters and neighborhood hub for saving energy.

The intelligent communications device 102 may enable Internet Protocol based communication involving end-to-end connectivity on a public wireless network. The intelligent communications device 102 may further facilitate two-way delivery of real-time energy usage data over a public wireless network. In an embodiment, the real-time data may include location information along with energy usage information.

In an embodiment of the present invention, the intelligent communications device 102 may include one or more communication ports for connecting to different types of communication devices. The intelligent communications device 102 may include switches, hubs or other interface circuitry for coupling with the external devices. Additionally, the intelligent communications device 102 may include a wireless communication module for connecting with wireless appliances and/or smart devices. In this aspect, the wireless devices such as smart appliances may be enabled by low power protocol such as 6 LOWPAN. Alternatively, the wireless devices may be enabled using Bluetooth, EDGE, IEEE 802.11, and/or infrared.

Open Standards Implementation

The intelligent communications device 102 may implement open standards to leveraige existing programs and tools. In this aspect, the intelligent communications device 102 may facilitate rapid application deployment and delivery of the new functionality. For example, the intelligent communications device 102 may update the applications and/or programs in real time. Additionally, updates corresponding to programs and/or applications may be executed at a predefined time in order to update the software, drivers, interface ports, applications. This may ensure that the intelligent communications device 102 may be fully equipped to deny any security attack on it. In another example, interfacing a new smart device with the intelligent communications device 102 may initiate a search for software. Failure to discover appropriate software may result in searching the required software at a remote location such as the Internet. Thus, the intelligent communications device 102 may perform self-healing by automatically scanning and integrating new devices and/or facilities in the smart grid infrastructure.

Enclosure

Figure 3A:
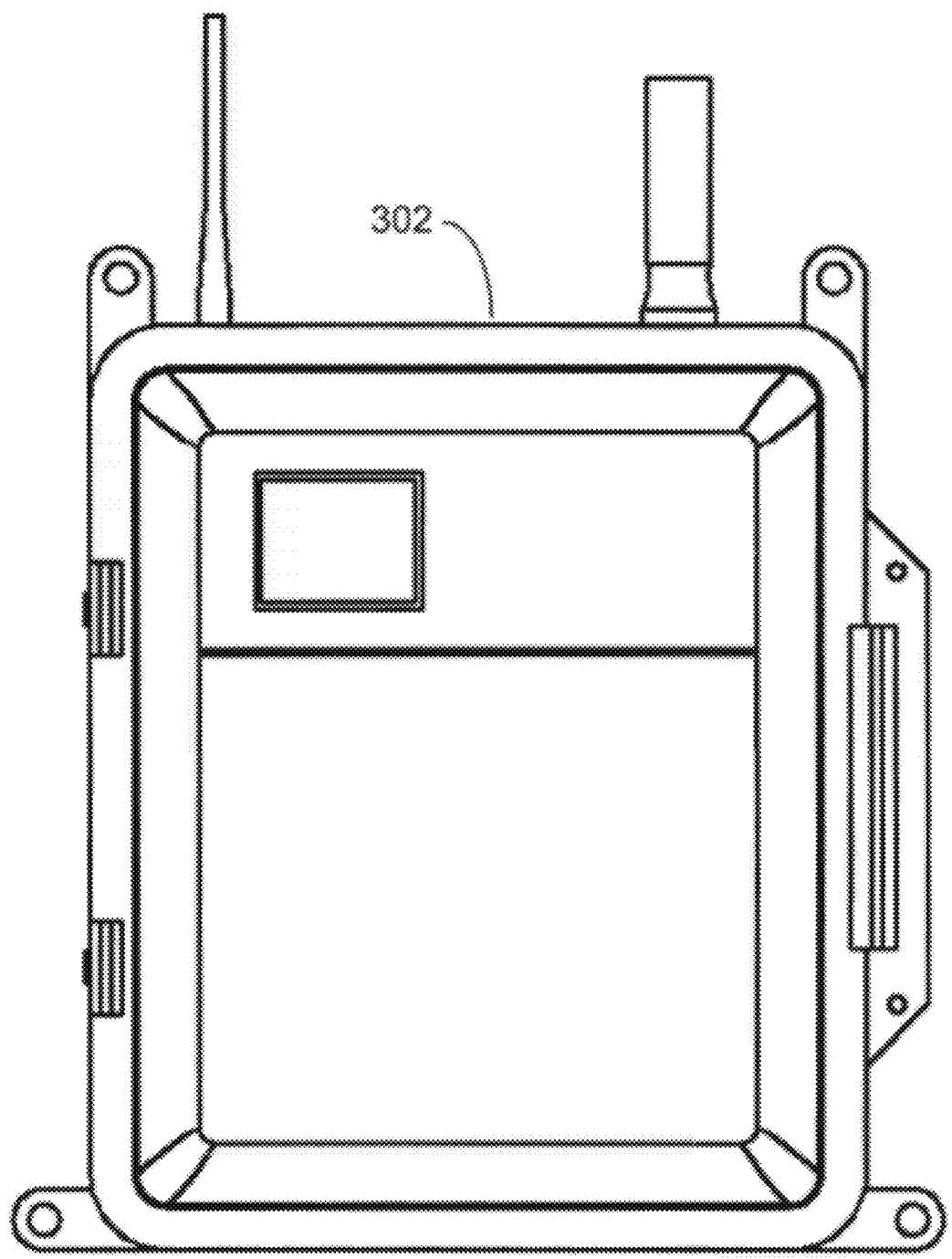
FIG. 3 depicts various modules associated with an intelligent communications device according to one embodiment of the present invention.

Referring to FIG. 3A, an outer enclosure 302 associated with the intelligent communications device 102 is shown, according to one embodiment of the present invention. The intelligent communications device 102 may be enclosed in proper casing 302 for rapid deployment. In this embodiment, the modular and compact design of the intelligent communications device 102 may protect it from damage during installation. The modular design may further enable rapid installation of intelligent communications device 102. For example, the compact modular design may facilitate installation of the intelligent communications device 102 within a small space.

In embodiments, the enclosure may be fabricated from metal, plastic, and other materials, which may be combined.

The compact modular design of the enclosure may be modified for installation in hazardous areas such as refineries, gas plants, and CNG stations. Special enclosures may be provided for installing the intelligent communications device 102 in hazardous areas. In an embodiment of the present invention, the casings and/or enclosures may facilitate a long operational lifetime of the intelligent communications device 102.

Figure 3B:
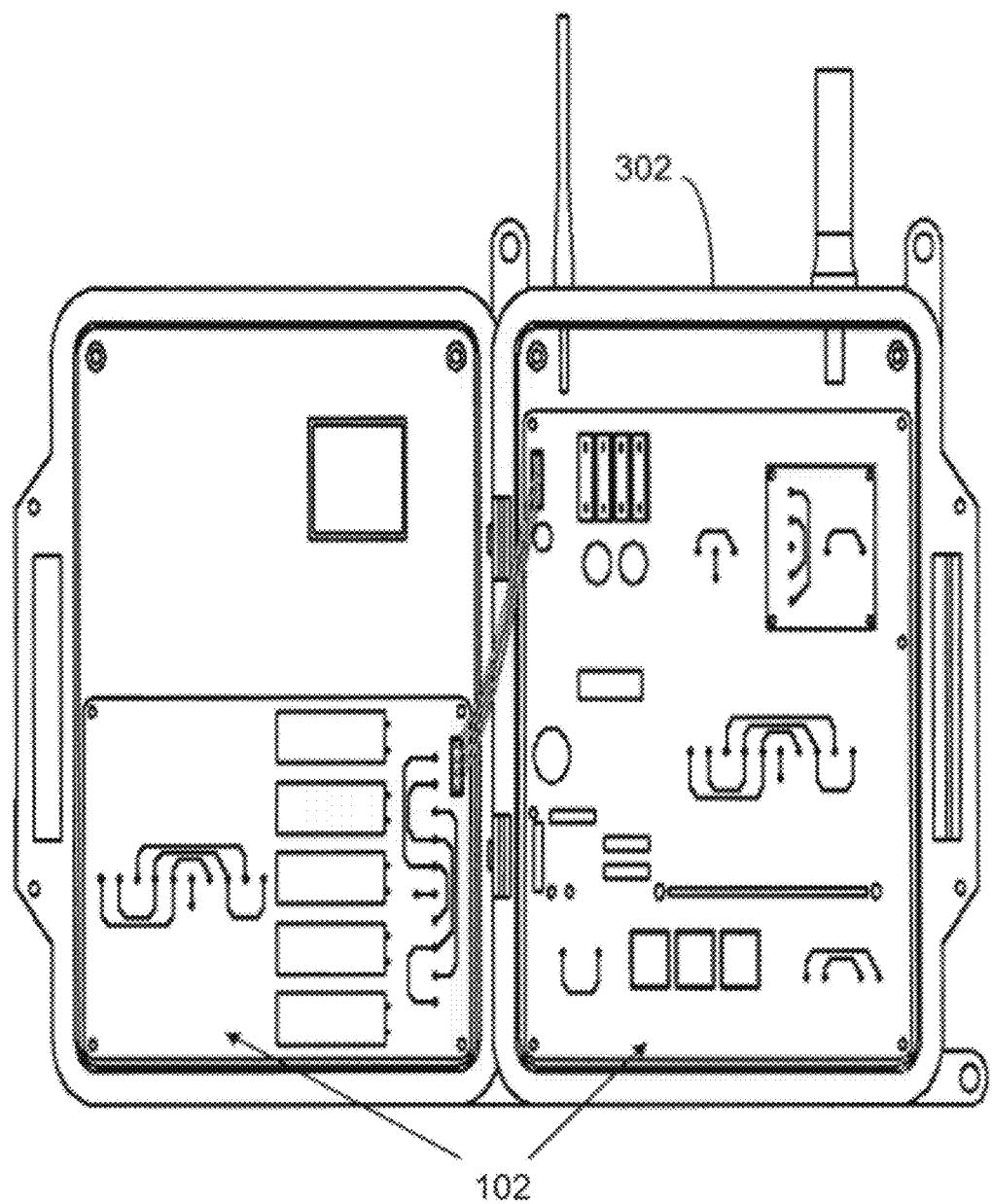

FIG. 3B depicts various circuit boards of the intelligent communications device 102 embedded in the enclosure 302 for safety. The enclosure may include circuitry 306, 308 to raise an alarm if the enclosure is tampered with by an unauthorized entity. Additionally, a provision may be provided in the apparatus that may intelligently determine if the enclosure is opened for repair through an authorized entity.

Management Tools

The intelligent communications device 102 may be interfaced with standard off-the-shelf network management tools. In an embodiment of the present invention, the management tools may be integrated in one or more utilities. Alternatively, the management tools may be implemented on computing devices such as personal computers, servers, and/or electrical control panels.

The intelligent communications device 102 may work in harmony with other smart devices in order to create a seamless infrastructure and to enhance the capability of the smart grid infrastructure. Thus, the intelligent communications device 102 may allow reclosers from one vendor to be integrated with the electronic meters from another vendor for building a collaborative smart grid infrastructure.

The intelligent communications device 102 may implement open source and may facilitate two-way delivery of real-time energy usage data over public wireless network. Further, the open source may simplify deployment of the smart devices in a smart grid infrastructure.

Security Features

In an embodiment of the present invention, the intelligent communications device 102 may secure communication between the intelligent communications device 102 and the external smart devices. For this purpose, the intelligent communications device 102 may implement various security algorithms as known in the art, including IP security and cryptography for secure transfer of data. Internet Protocol Security (IPsec) is a protocol suite for securing Internet Protocol (IP) communications by authenticating and encrypting each IP packet of a data stream. In another embodiment, the intelligent communications device 102 may implement RSA algorithm for securing data transfer.

In embodiments, the intelligent communications device 102 may facilitate collaboration between various interconnected equipment in the smart grid infrastructure. For example, the intelligent communications device 102 may facilitate collaboration between groups of consumers. In another example, the intelligent communications device 102 may facilitate collaboration between different electrical appliances belonging to a particular consumer. In yet another example, the intelligent communications device 102 may facilitate optimization and collaboration of electricity usage related to a particular electrical appliance, for example, a consumer washing machine.

The transmission aspect may be focused on surveillance, fault management, and/or voltage regulation, among others. The intelligent communications device 102 includes software and/or applications for monitoring and surveillance, fault management, and/or voltage regulation. Reports of unusual activity detected by the intelligent communications device 102 may be forwarded to a control station or to security staff via alert. The recorded data may be recorded in a log file, which may be forwarded to the concerned authority in real-time for remedial action. Alternatively, the intelligent communications device 102 may, based on its own capability, resolve the issue without raising an alert.

The distribution aspect may include among other aspects monitoring and management of switches, meters, and/or reclosers. The intelligent communications device 102 may allow integration of various devices into seamless smart grid configuration. For example, a meter from one vendor may be configured with the recloser from another vendor. By implementing open standards in the intelligent communications device 102, the distribution companies can focus on building the smart grid infrastructure without worrying about the product working on a dedicated technology, since the intelligent communications device 102 may act as a universal hub for integrating various technologies.

A consumer may utilize the intelligent communications device 102 for conserving electrical consumption. In this aspect, consumer devices may be directly connected with the intelligent communications device 102. Exemplary consumer devices may include transformers, fault management devices, power meters, water meters, gas meters, load limiters, and disconnect switches. The intelligent communications device 102 may manage these smart devices in an optimum manner for saving electricity.

Solar Power

In an embodiment of the present invention, the intelligent communications device 102 may be solar powered. The outer enclosure of the intelligent communications device 102 maybe fitted with photovoltaic cells that may receive solar energy. The solar energy may be utilized to charge one or more batteries; the charged batteries may allow communication with utility management infrastructure even during a power failure. Thus, the apparatus may work continuously without interruption.

Solar power may be further utilized to provide power for critical activities during a power failure, such as clock, wireless facility, memory and other communication circuitry.

Computer-Executable Software Embodiments

In an embodiment of the present invention, the intelligent communications device 102 may include software and hardware for implementing virtualization. For example, the intelligent communications device 102 may implement hardware virtualization. Implementing virtualization may facilitate the process of disaster recovery, induce higher levels of abstraction, and increased level of security.

In yet another embodiment of the present invention, the intelligent communications device 102 may include software for implementing distributed computing architecture. For example, various software processes may communicate with databases/repositories of the central control station to periodically update the repositories and/or databases. Such an arrangement may reduce the probability of loss of data during disaster and/or failure of other equipment.

In yet another embodiment of the present invention, the software-implemented multiple processes enable processing of data in real time. In this aspect, the software executed by the associated processor may spawn multiple threads for faster execution and real-time monitoring of the utilities. Such implementation may facilitate quick response to adverse events, thereby reducing the probability of failure of the overall infrastructure.

Figure 3C:
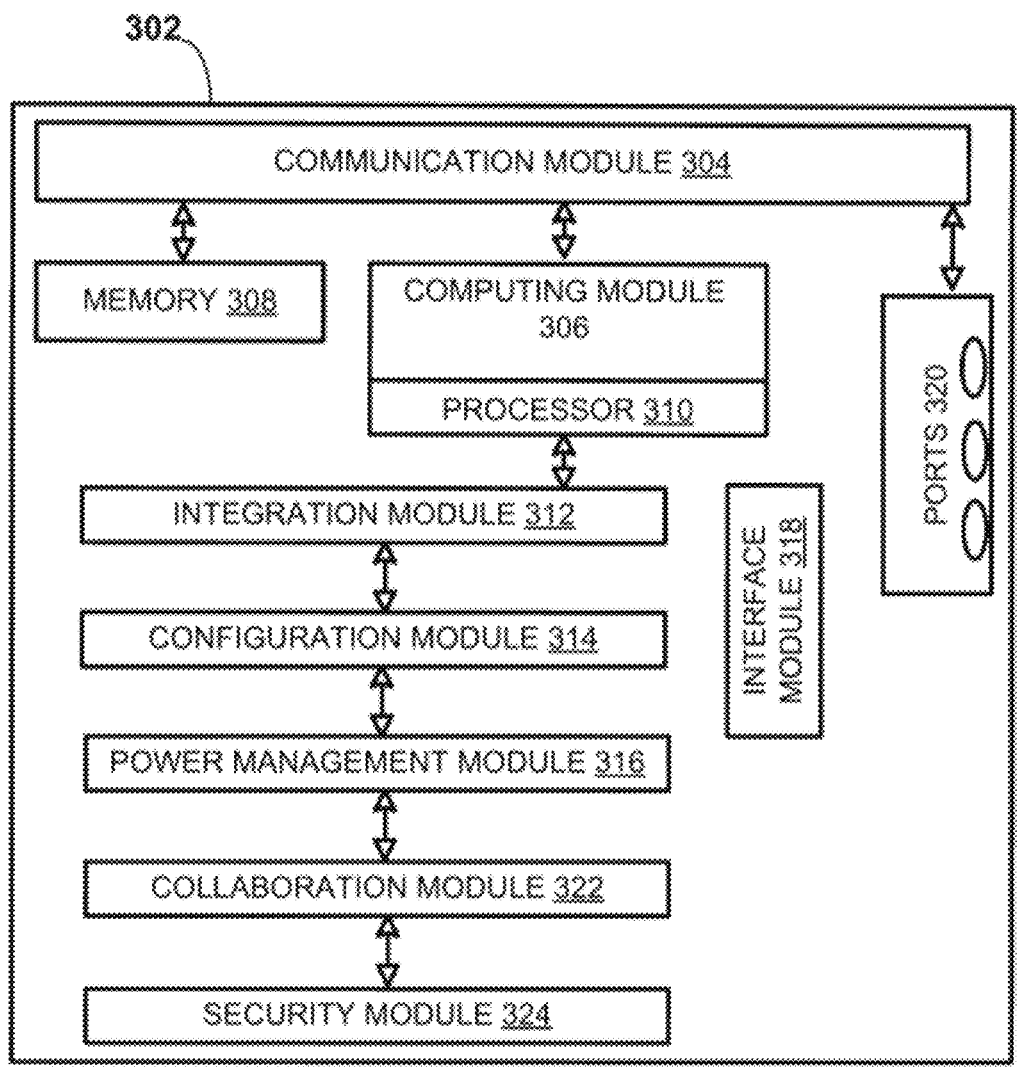

Referring to FIG. 3C, the intelligent communications device 102 may include an enclosure 302, a communication module 304, a memory 308, and a computing module 306 having a processor 310. The communication module 304 may be coupled with the memory 308 and to the computing module 306. In addition, the computing module 306 may be associated with the integration module 312 as well as interface module 318. The smart devices and/or facilities may be attached at one or more ports 320. The data received at one or more ports 320 may be forwarded to an integration module 312, a configuration module 314, a power management module 316, and the collaboration module 322. Additionally, smart devices may be incorporated into the smart grid infrastructure using a collaboration module 322.

In an embodiment of the present invention, addition of a device at one of the ports 320 may initiate integration of the device into the smart grid infrastructure. The signal received from the device may be forwarded to the interface module 318 to determine the type of device, attributes, and other details for integration with the intelligent communications device 102. Once the parameters of the devices have been ascertained, the integration module 312 and the configuration module 314 may facilitate integration for incorporating the device into the smart grid infrastructure. For example, the configuration module 314 may search for device drivers, applications and other software that may enable smooth adaptation of the device into the smart grid infrastructure.

In an embodiment of the present invention, a security module 324 may secure communication between the external smart devices and/or various facilities. For example, the security module may use encryption techniques known in the art for protecting data. Likewise, different security protocols may be implemented by the security module 324 for protecting data.

Figure 4:
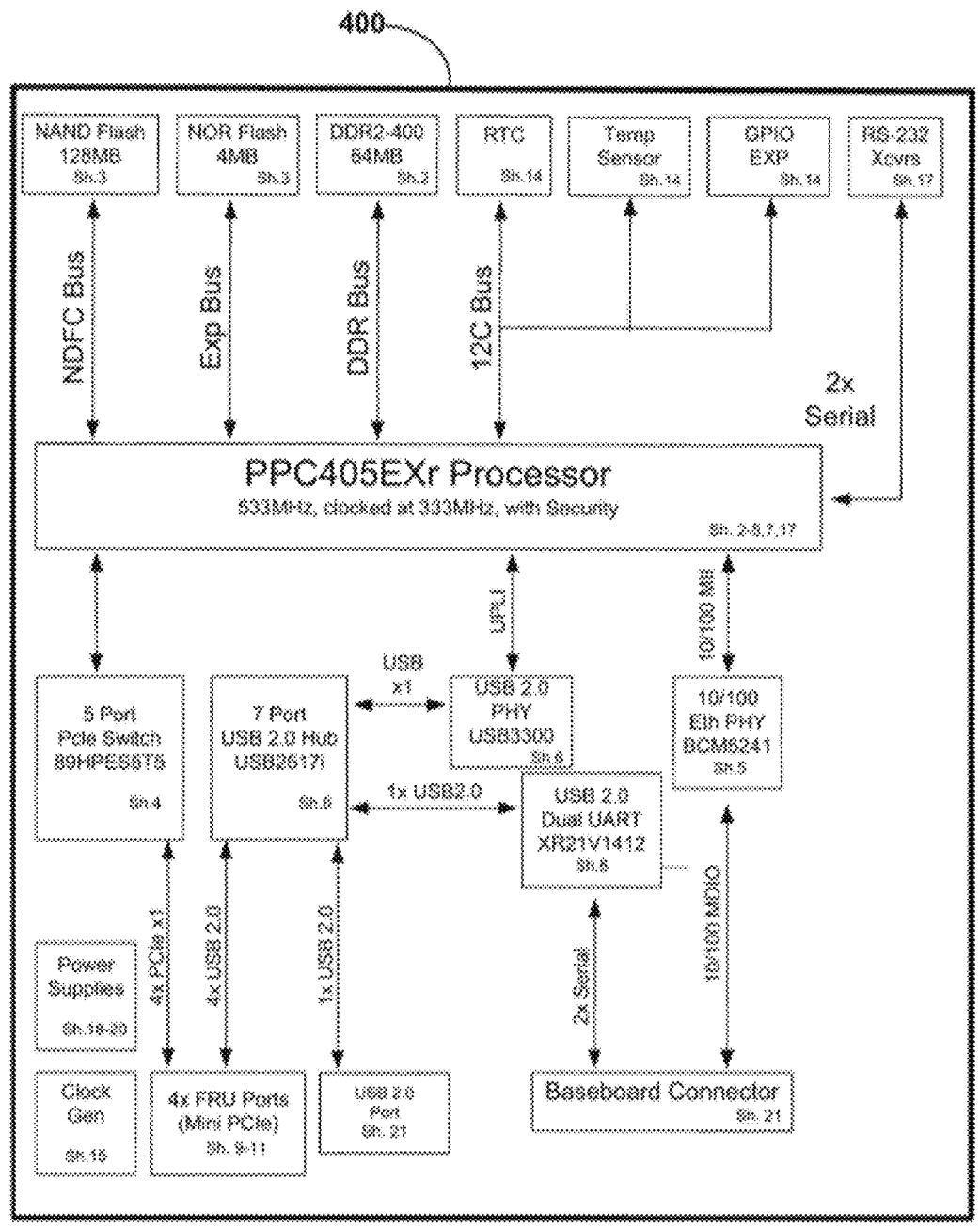
FIG. 4 schematically shows operative circuitry for an intelligent communications device according to one or more embodiments of the present invention.

Referring to FIG. 4, an exemplary outlay 400 of an intelligent communications device 102 is shown, according to one embodiment of the present invention. The internal configuration of the apparatus 400 may include a NAND flash, a NOR flash, a RAM, Temperature sensor, a, RTC, a GPIO, and an interface circuitry such as RS232 coupled to the processor, such as PPC405 EXr Processor. Additionally, a plurality of ports may be interfaced with the processor, such as USB ports, Ethernet ports, switch input connectors, and/or hubs. The circuitry may receive AC/DC power from the power supply, and the power supply may deliver different voltages such as +5V, −5V, +12V, −12V, +15V, −15V and other voltages. Various connectors may be utilized for connecting different type of active and passive components. A clock generation circuitry may be provided for servicing circuits requiring clock pulses.

In an embodiment of the present invention, integrated circuits may be utilized for assembling the embodiment shown in FIG. 4 in association with other active and passive electronic components. Additionally, the circuitry may be laid on a multiple tier PCB for laying the passive and active electronic components and circuits.

Board Slot Concatenation

Figure 5:
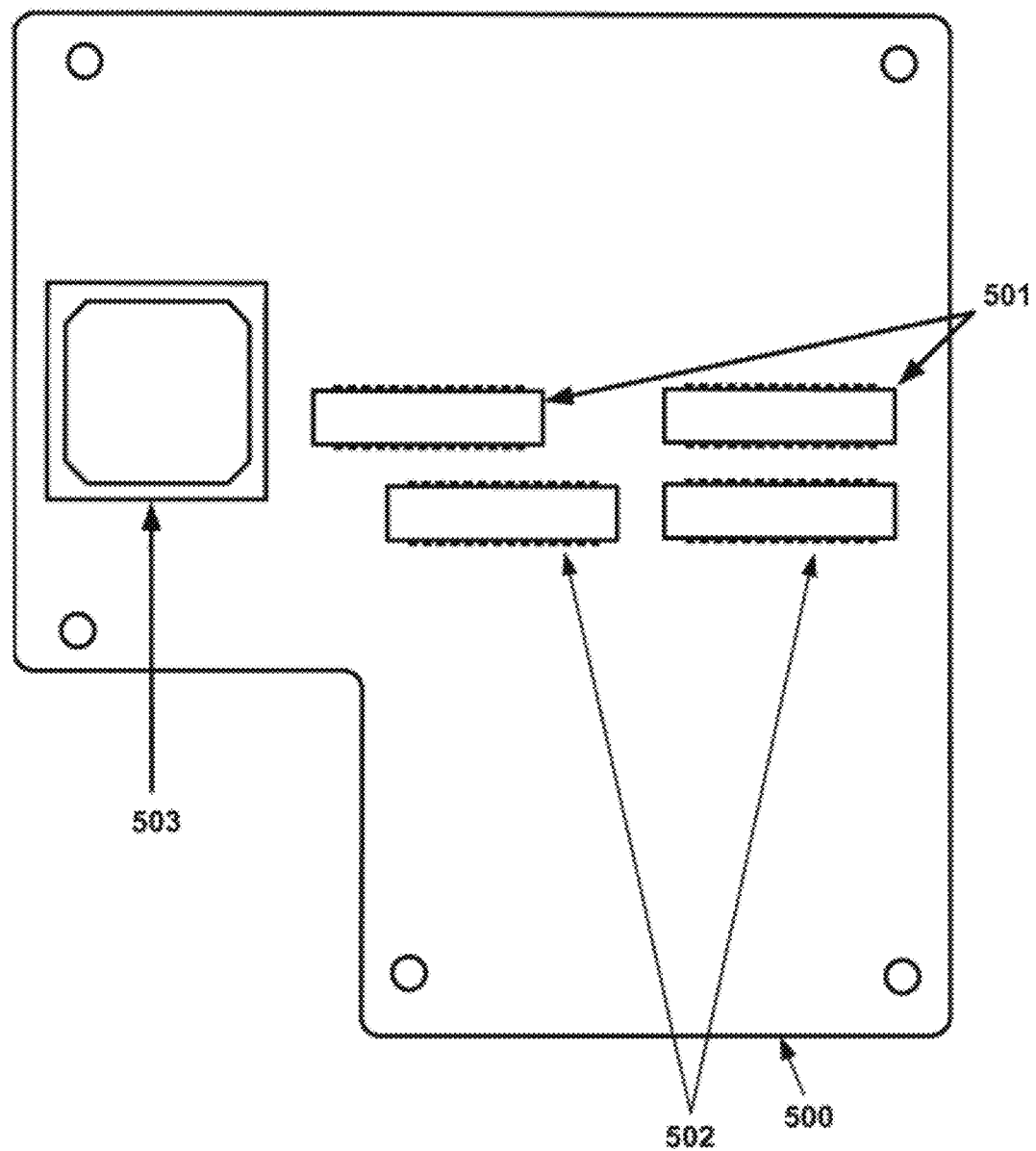
FIG. 5 illustrates an expansion slot of a main circuit board and its associated components, in accordance with various embodiments of the present invention.

FIG. 5 illustrates a first and a second pair of expansion slots 501 and 502 of a main circuit board 500 and associated components, in accordance with various embodiments of the present invention. The main circuit board 500 may be used, for example, with a computing device or in a network of computers. The main circuit board 500 may include a number of other components (not specifically shown in FIG. 5) such as a processor, memory devices, bridge logic, a keyboard controller, and/or an internal bus controller.

The main circuit board 500, as shown in FIG. 5 includes a first pair of expansion slots 501, a second pair of expansion slots 502, and a programmable processor 503. In an embodiment, the first pair and the second pair of expansion slots 501 and 502 may include corresponding expansion slot connectors that may be connected to the internal bus connectors of the main circuit board 500. In an embodiment, the internal bus connector may be for example, one or more of Peripheral Component Interconnect (PCI) connectors, PCI-X connectors, and PCI-Express (PCIe) connectors. Additionally, the expansion slots 501 and 502 may be positioned on the main circuit board 500 in a central region.

In an embodiment, the first pair of expansion slots 501 and the second pair of expansion slots 502 receive one or more expansion cards. In this regard, the expansion slots 501 and 502 may be spaced at a distance from each other on the main circuit board 500 such that expansion cards having different size and dimensions can be inserted in the provided expansion slots 501 and 502. In an embodiment, the expansion cards used in a computer may be network cards, sound cards, modems, extra ports such as USB or serial, TV tuner cards, and/or disk controllers.

Referring again to FIG. 5, an expansion card may be connected to the first pair of expansion slots 501 configured at a first position on the main circuit board 500. Additionally, another expansion card may be connected to the second expansion slot 502 that may be configured at a second position that is different from the first position, with respect to the first pair of expansion slots 501 on the main circuit board 500, as shown in FIG. 5.

In an embodiment, the main circuit board 500 has a programmable processor 503 that may selectively supply and regulate power supplied to the expansion slots. Also, the programmable processor 503 may selectively regulate temperature at the expansion slots.

As indicated above, the expansion slots 501 and 502 may be spaced at a distance on the main circuit board 500 such that the expansion cards having different size and dimensions can be inserted into the provided expansion slots 501 and 502.

Figure 6:
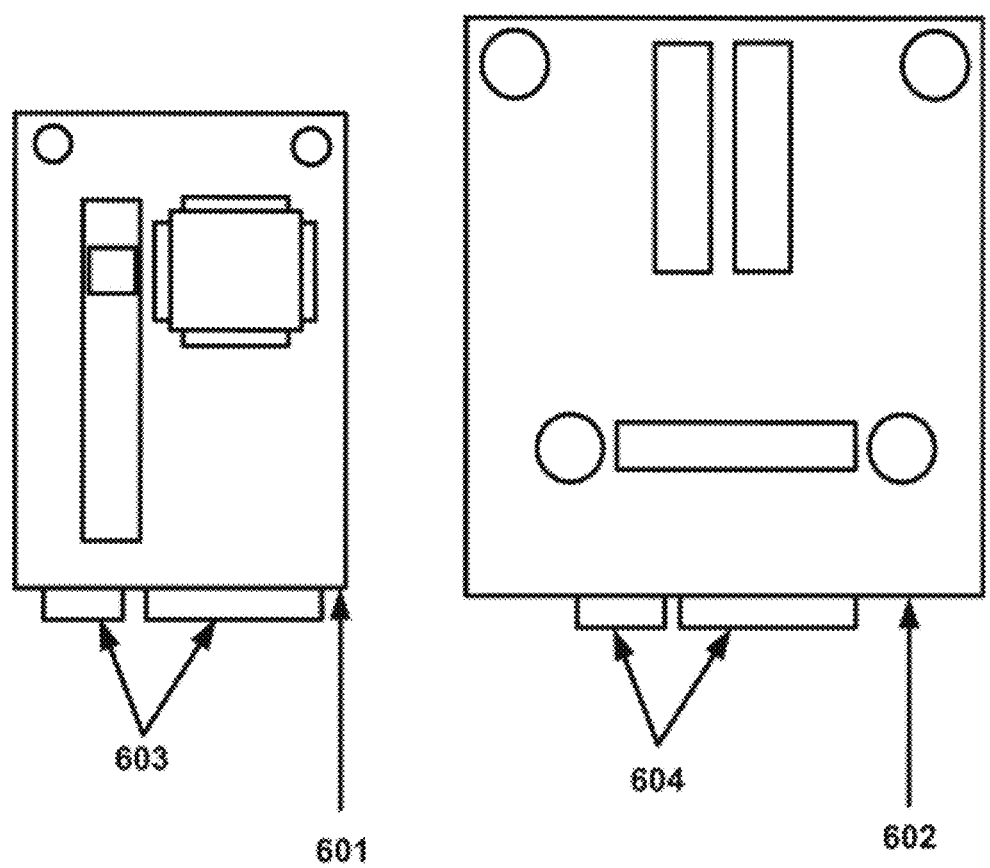
FIG. 6 illustrates secondary expansion cards in accordance with various embodiments of the present invention.

FIG. 6 depicts secondary expansion cards 601 and 602, in accordance with various embodiments of the present invention. In an embodiment, the secondary expansion cards 601 and 602, as shown in FIG. 6, may be of standard size, full size, half size, and/or double size.

In one embodiment, the secondary expansion card 601 is a full size expansion card. As known in the art, a common full size PCI Express Mini Card has a height of 30 mm (1.81 inches) and a depth of 60 mm (2.362 inches). Referring again to FIG. 6, the full size expansion card 601 includes an adjacent pair of edge connectors 603 that may be configured to be connected to either of the single adjacent expansion card slot arranged as the pair of expansion slots 501 or 502 on the main circuit board 500, such that the adjacent pair of edge connectors 603 may be aligned with the adjacent expansion slots of 501 or 502 of the pair of expansion slots 501 and 502.

In another embodiment, the secondary expansion card 602 can be a double size expansion card. For the purpose of this description, the dimensions of the double size expansion card 602 may vary. Referring again to FIG. 6, the double size expansion card 602 may include an adjacent pair of edge connectors 604 that may be configured to be connected to two adjacent expansion card slots 501 or 502 arranged as the pair of expansion slots 501 or 502 on the main circuit board 500, such that the adjacent pair of edge connectors 604 may be aligned with the adjacent expansion slots 501 or 502 of the pair of expansion slots.

Figure 7:
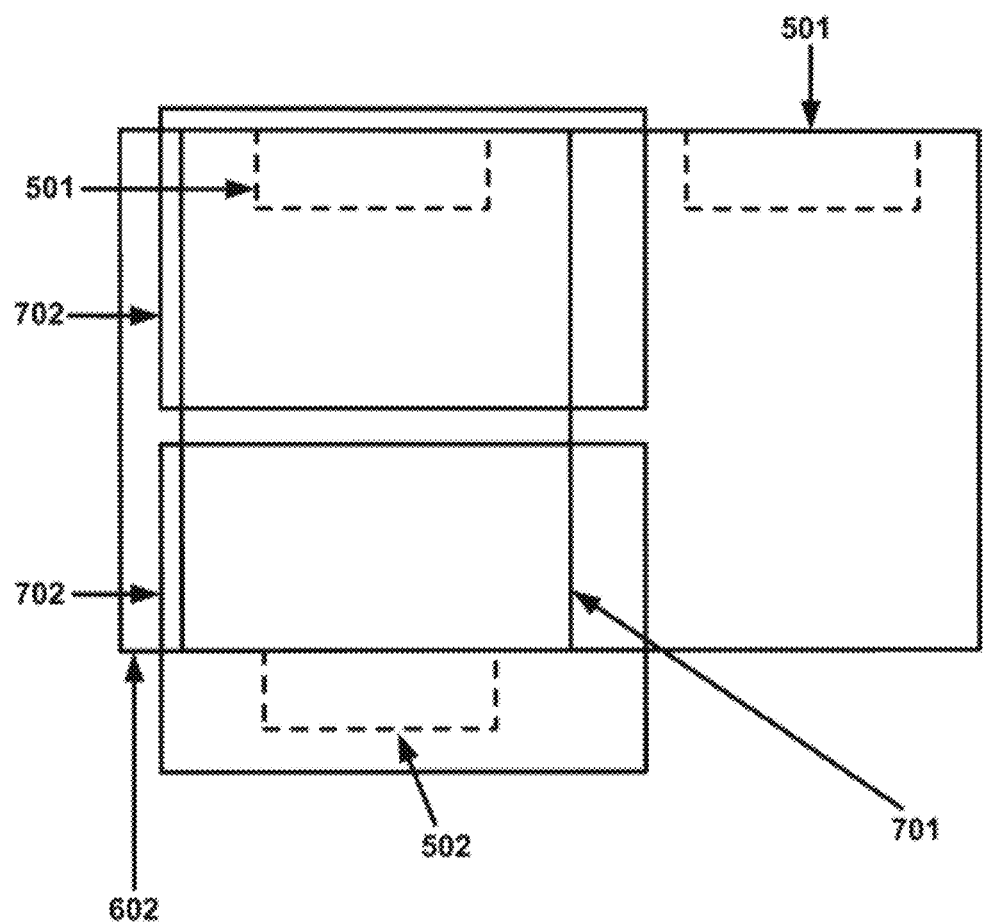
FIG. 7 illustrates secondary expansion cards connected to expansion slots on a main circuit board, in accordance with various embodiments of the present invention.

FIG. 7 illustrates secondary expansion cards 602, 701, and 702 connected to expansion slots 501 and 502, in accordance with various embodiments of the present invention. In an embodiment, the first pair of expansion slots 501 and the second pair of expansion slots 502 may receive one or more secondary expansion cards 602, 701, and 702. The secondary expansion cards 602, 701, and 702 may have different size and dimensions and can be inserted in the provided expansion slots 501 and 502. The secondary expansion cards 602, 701, and 702 connected to the expansion slots 501 and 502 may be network cards, sound cards, modems, extra ports such as USB or serial, TV tuner cards, and/or disk controllers.

In an embodiment, the secondary expansion cards 602, 701, and 702 can be one or more of standard size expansion cards, half size expansion cards, and double size expansion cards, respectively. These secondary expansion cards (602, 701, and 702) may be connected to the first pair and the second pair of expansion slots 501 and 502. In an embodiment, two half size expansion cards 702 may be connected to one slot of the first pair of expansion slots 501, and may be connected to another slot of the second pair of expansion slots 502. Further, as shown in FIG. 7, one double size expansion card 602 may be connected to the first pair of expansion slots 501. Additionally, one standard size expansion card 701 may be connected to a slot of the first pair of expansion slots 501, and may be connected to another slot of the second pair of expansion slots 502. Therefore, the expansion slots 501 and 502 are spaced at a distance on the main circuit board 500 such that the secondary expansion cards 602, 701, and 702 having different size and dimensions can be inserted into the provided expansion slots 501 and 502.

Figure 8:
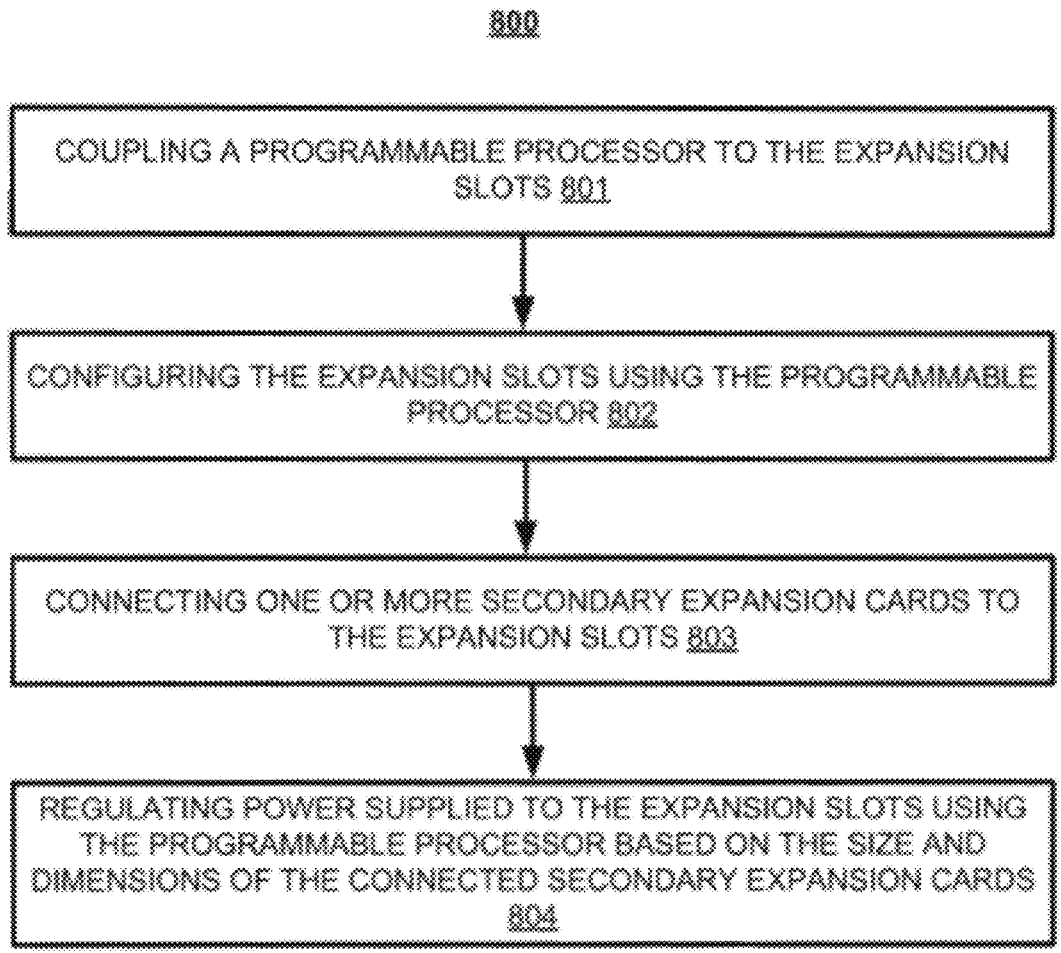
FIG. 8 illustrates operational steps of a method for operating a secondary expansion card configured on an expansion slot, according to one embodiment of the present invention.

FIG. 8 illustrates operational steps of a routine 800 for operating a plurality of secondary expansion cards 601 and 602 configured on a plurality of expansion slots 501 and 502. The order in which the routine 800 is described is not intended to be construed as a limitation, and any number of the described blocks can be combined in any order to implement the routine, or an alternative routine. Additionally, individual blocks may be deleted from the routine without departing from the spirit and scope of the subject matter described herein. Furthermore, the routine can be implemented in any suitable hardware, software, firmware, or combination thereof. The exemplary routine may be described in the general context of computer executable instructions. Generally, computer executable instructions can include routines, programs, objects, components, data structures, procedures, modules, and functions that perform particular functions or implement particular abstract data types.

At block 801, a programmable processor is coupled to the first pair and the second pair of expansion slots 501 and 502 on the main circuit board 500. The main circuit board 500 may be used in, for example, a computing device or in a network such as a LAN or WAN. In embodiments, the first pair and the second pair of expansion slots 501 and 502 may include corresponding expansion slot connectors that are connected to the internal bus connectors of the main circuit board 500. In embodiments, the internal bus connectors may be for example, Peripheral Component Interconnect (PCI) connectors, PCI-X connectors, and/or PCI-Express (PCIe) connectors.

At block 802, the first and the second pair of expansion slots 501 and 502 are configured using the programmable processor 503. In this regard, the first and the second pair of expansion slots 501 and 502 may be spaced at a distance on the main circuit board 500 such that a secondary expansion card 601 and 602 having different size and dimensions from a full size or standard size expansion card can be connected to the expansion slots 501 and 502.

At block 803, one or more secondary expansion cards 601 and 602 are connected to the first pair or the second pair of the expansion slots 501 or 502. The secondary expansion cards 601 and 602 can be network cards, sound cards, modems, extra ports such as USB or serial, TV tuner cards, and/or disk controllers. Additionally, the secondary expansion cards 601 and 602 may be used to operatively couple legacy devices such as radio systems to the main circuit board 500. In an embodiment, the secondary expansion cards 601, 602, 701, and 702 can be one or more of standard size expansion cards, half size expansion cards, and double size expansion cards. The size and dimensions of the secondary expansion cards 601, 602, 701 and 702 may vary.

At block 804, the power supplied to the expansion slots 501 and 502 is regulated using the programmable processor 503. In embodiments, the power supplied to the particular expansion slots 501 and 502 may be based on the size, dimensions, and/or function of the secondary expansion cards 601 and 602 operatively coupled. For example, a double or a full size expansion card connected to the expansion slots 501 or 502 may receive more power from the programmable processor 503, as compared to a standard size expansion card or a half size expansion card.

The methods described herein may be deployed in part or in whole through one or more devices that are capable of executing computer software, program codes, and/or instructions on corresponding processors. A processor may be part of a server, client, network infrastructure, mobile computing platform, stationary computing platform, or other computing platform. The processor may be any kind of computational or processing device capable of executing program instructions, codes, and/or binary instructions. The processor may be or may include a signal processor, a digital processor, an embedded processor, a microprocessor or any variant such as a co-processor (e.g. a math co-processor, a graphic co-processor, and/or a communication co-processor), that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program and instructions are described herein may be implemented in one or more threads. A thread may spawn other threads that may have assigned priorities associated with them; the processor may execute these threads based on a priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other types of instructions capable of being executed by the computing or processing device may include, but may not be limited to, one or more of a CD-ROM, DVD, memory, hard disk, flash drive, RAM, ROM, and/or cache.

The processor may include one or more cores that may enhance speed and performance of a multiprocessor. In embodiments, the process may be a dual core processor, quad core processors, or other chip-level multiprocessors that combine two or more processors.

The methods and systems described herein may transform physical and/or or intangible items from one state to another. The methods and systems described herein may also transform data representing physical and/or intangible items from one state to another.

The elements described and depicted herein, including the elements described in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, and/or routers. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application-specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs steps thereof. In another aspect, the methods may be embodied in systems that perform steps thereof, and may be distributed across devices in a number of ways, or all of the functionality may be integrated into a dedicated, standalone device or other hardware. In another aspect, the means for performing steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples.

What is claimed is:

1. A main circuit board comprising:
a plurality of expansion slots operative to receive a corresponding plurality of expansion cards, the plurality of expansion slots including at least one first expansion slot configured at a first position on the main circuit board and operative to connect to at least one corresponding first expansion card, and at least one second expansion slot configured at a second position on the main circuit board and operative to connect to at least one corresponding second expansion card, wherein the plurality of expansion cards includes at least one secondary expansion card that is different from the main circuit board and that is configured to be operatively coupled to at least one of the plurality of expansion slots when connected thereto, and wherein one or more particular expansion slots of the plurality of expansion slots are selected for connecting one or more corresponding particular expansion cards based on the size and dimensions of the particular expansion cards to be connected thereto; and
a programmable processor operative to selectively regulate power supplied to particular expansion slots of the plurality of expansion slots.

2. The main circuit board of claim 1, wherein the plurality of secondary expansion cards comprises standard size expansion cards, half size expansion cards, and double size expansion cards.

3. The main circuit board of claim 2, wherein the double size expansion cards comprise an adjacent pair of edge connectors configured to be operatively coupled to two adjacent expansion card slots such that the adjacent pair of edge connectors is aligned with the two adjacent expansion slots.

4. The main circuit board of claim 1, wherein at least one of the plurality of expansion card slots is spaced at a distance on the main circuit board from another at least one of the plurality of expansion card slots such that secondary expansion cards having different size and dimensions from other secondary expansion cards are capable of being operatively coupled thereto.

5. The main circuit board of claim 1, wherein the programmable processor is programmed to selectively supply power to particular expansion slots of the plurality of expansion slots.

6. The main circuit board of claim 1, wherein the programmable processor is operative to selectively regulate the temperature of at least one of the plurality of expansion slots.

7. The main circuit board of claim 1, wherein the plurality of expansion slots are positioned in a central region of the main circuit board.

8. The main circuit board of claim 1, wherein the plurality of the expansion slots comprise corresponding expansion slot connectors that are operative to connect to corresponding internal bus connectors of the main circuit board, and wherein the internal bus connectors comprise at least one of Peripheral Component Interconnect (PCI) connectors, PCI-X connectors, and PCI-Express (PCIe) connectors.

9. A method of configuring a plurality of expansion slots on a main circuit board for operating one or more secondary expansion card, the method comprising:
operatively coupling a programmable processor to the plurality of expansion slots on the main circuit board;
configuring, using the programmable processor, the plurality of expansion slots operative on the main circuit board, wherein at least one pair of the plurality of expansion slots are spaced at a distance on the main circuit board such that a secondary expansion card having different size and dimensions from at least one other secondary expansion card is capable of being operatively coupled thereto; and
regulating, using the programmable processor, power supplied to particular expansion slots of the plurality of expansion slots based on at least one of the size, dimensions, and function of the secondary expansion cards operatively coupled thereto.

10. The method of claim 9, wherein the main circuit board comprises:
the plurality of expansion slots operative to receive the corresponding secondary expansion cards, the plurality of expansion slots including at least one first expansion slot mounted at a first position on the main circuit board, and at least one second expansion slot mounted at a second position on the main circuit board, wherein the secondary expansion cards include at least one secondary expansion card connected to at least one of the plurality of expansion slots, and wherein particular expansion slots of the plurality of the expansion slots are selected for receiving particular secondary expansion cards based on the size and dimensions of the corresponding secondary expansion cards to be received therein; and a programmable processor operative to selectively regulate power supplied to particular expansion slots of the plurality of expansion slots.

11. The method of claim 9, wherein the plurality of secondary expansion cards comprises standard size expansion cards, half size expansion cards, and double size expansion cards.

12. The method of claim 11, wherein the double size expansion cards comprise an adjacent pair of edge connectors configured to be operatively coupled to two adjacent expansion card slots such that the adjacent pair of edge connectors is aligned with the two adjacent expansion slots.

13. The method of claim 9, wherein at least one of the plurality of expansion card slots is spaced at a distance on the main circuit board from another at least one of the plurality of expansion card slots such that secondary expansion cards having different size and dimensions from other secondary expansion cards are capable of being operatively coupled thereto.

14. The method of claim 9, wherein the programmable processor is programmed to selectively supply power to particular expansion slots of the plurality of expansion slots.

15. The method of claim 9, wherein the programmable processor is operative to selectively regulate the temperature of at least one of the plurality of expansion slots.

16. The method of claim 9, wherein the plurality of expansion slots are positioned in a central region of the main circuit board.

17. The method of claim 9, wherein the plurality of the expansion slots comprise corresponding expansion slot connectors that are operative to connect to corresponding internal bus connectors of the main circuit board, and wherein the internal bus connectors comprise at least one of Peripheral Component Interconnect (PCI) connectors, PCI-X connectors, and PCI-Express (PCIe) connectors.

18. A main circuit board comprising:
a plurality of expansion slots configured to operatively connect to a corresponding plurality of expansion cards, the plurality of expansion slots including, a plurality of first expansion slots disposed at a first position on the main circuit board, and operative to connect to a corresponding plurality of first expansion cards, and a plurality of second expansion slots disposed at a second position on the main circuit board and operative to connect to a corresponding plurality of second expansion cards, wherein at least one pair of the plurality of expansion slots is spaced at a distance on the main circuit board such that an expansion card having a different size and function from at least one other expansion card is operatively connected to the at least one pair of the plurality of expansion slots, wherein at least one of the plurality of expansion cards comprises an adjacent pair of edge connectors configured to be operatively coupled to two adjacent expansion slots of the first or the second expansion slots such that the adjacent pair of edge connectors are aligned with the two adjacent expansion slots; and
a programmable processor operative to selectively regulate power supplied to particular expansion slots of the plurality of expansion slots, wherein the programmable processor is programmed to selectively regulate the temperature of at least one of the plurality of expansion slots.

19. The main circuit board of claim 18, wherein the plurality of secondary expansion cards comprise standard size expansion cards, half size expansion cards, and double size expansion cards.

20. The main circuit board of claim 19, wherein the double size expansion cards comprise an adjacent pair of edge connectors configured to be operatively coupled to two adjacent expansion slots such that the adjacent pair of edge connectors are aligned with the two adjacent expansion slots.

21. The main circuit board of claim 18, wherein at least one of the plurality of expansion slots is spaced at a distance on the main circuit board from another at least one of the plurality of expansion slots such that secondary expansion cards having different size and dimensions from other secondary expansion cards are capable of being operatively coupled thereto.

22. The main circuit board of claim 18, wherein the programmable processor is programmed to selectively supply power to particular expansion slots of the plurality of expansion slots.

23. The main circuit board of claim 18, wherein the plurality of expansion slots are positioned in a central region of the main circuit board.

24. The main circuit board of claim 18, wherein the plurality of expansion slots comprise corresponding expansion slot connectors that are operative to connect to corresponding internal bus connectors of the main circuit board, and wherein the internal bus connectors comprise at least one of Peripheral Component Interconnect (PCI) connectors, PCI-X connectors, and PCI-Express (PCIe) connectors.

\* \* \* \* \*